US007836448B1

(12) United States Patent
Farizon et al.

(10) Patent No.: US 7,836,448 B1
(45) Date of Patent: Nov. 16, 2010

(54) SYSTEM AND METHODS FOR TASK MANAGEMENT

(75) Inventors: Boris Farizon, Westborough, MA (US); Urayoan Irizarry, Worcester, MA (US); Mordechai Zvi Zur, Newton, MA (US); Ohad Zeliger, Westborough, MA (US); Jeffrey Louis Alexander, Watertown, MA (US); Ilya Liubovich, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1524 days.

(21) Appl. No.: 10/881,332

(22) Filed: Jun. 30, 2004

(51) Int. Cl.
*G06F 9/46* (2006.01)
*G06F 15/173* (2006.01)

(52) U.S. Cl. ....................... 718/100; 718/102; 718/104; 718/105; 709/225; 709/226

(58) Field of Classification Search ..................... 718/1, 718/100, 101, 102, 103, 104, 105; 709/201, 709/202, 212, 213, 214, 215, 217, 223–226
See application file for complete search history.

(56) References Cited

U.S. PATENT DOCUMENTS 5,673,381 A * 9/1997 Huai et al. ..................... 714/1
6,061,059 A * 5/2000 Taylor et al. ................ 715/764
6,263,359 B1 * 7/2001 Fong et al. .................. 718/103
6,327,587 B1 * 12/2001 Forster ............................. 1/1
6,708,330 B1 * 3/2004 Moberg et al. .............. 717/158
6,813,705 B2 * 11/2004 Duesterwald et al. ....... 712/216
6,901,430 B1 * 5/2005 Smith ......................... 709/206
6,934,724 B1 * 8/2005 Deshayes et al. ............ 707/204
6,948,172 B1 * 9/2005 D'Souza ..................... 718/106
6,978,282 B1 * 12/2005 Dings et al. ................. 707/204
6,980,963 B1 * 12/2005 Hanzek ....................... 705/26
7,093,259 B2 * 8/2006 Pulsipher et al. ............ 718/106
7,383,544 B2 * 6/2008 Kawahito et al. ........... 717/161
7,464,147 B1 * 12/2008 Fakhouri et al. ............ 709/223
2003/0074342 A1 * 4/2003 Curtis ........................... 707/1
2003/0120701 A1 * 6/2003 Pulsipher et al. ............ 709/102
2003/0120708 A1 * 6/2003 Pulsipher et al. ............ 709/106
2003/0120709 A1 * 6/2003 Pulsipher et al. ............ 709/106
2003/0225663 A1 * 12/2003 Horan et al. .................. 705/36
2004/0019770 A1 * 1/2004 Kawahito ................... 712/227
2004/0078105 A1 * 4/2004 Moon et al. ................. 700/100
2004/0122942 A1 * 6/2004 Green et al. ................ 709/224
2004/0128659 A1 * 7/2004 Robison ..................... 717/153
2004/0133876 A1 * 7/2004 Sproule ...................... 717/105

(Continued)

*Primary Examiner*—Li B Zhen
*Assistant Examiner*—Abdullah Al Kawsar
(74) *Attorney, Agent, or Firm*—Chapin IP Law, LLC; Barry W. Chapin, Esq.

(57) ABSTRACT

In a storage area network (SAN), different tasks may expect different types of commands for commencing execution, such as interactive or offline, and may have different formats for reporting status and completion, such as log files or message based. A framework for defining the business logic enveloped in a particular task, and providing a common manner of deploying, or enabling invocation, of the task provides consistent operator control for scheduling, monitoring, ensuring completion, and tracking errors and other events. Business logic modules are identified as commands corresponding to a task. Transactions including a set of the commands define an ordered sequence for completing the task. The operator requests a particular set of tasks, using a selection tree, and the task manager builds a corresponding execution tree to identify and map the transactions and commands of the task to the execution tree to optimize execution and mitigate redundancies.

26 Claims, 8 Drawing Sheets

U.S. PATENT DOCUMENTS

2004/0205206 A1* 10/2004 Naik et al. .................. 709/230
2005/0071832 A1* 3/2005 Kawahito ................... 717/151
2005/0132043 A1* 6/2005 Wang et al. ................. 709/224
2005/0283785 A1* 12/2005 D'Souza ..................... 718/100
2008/0301454 A1* 12/2008 Malcolm et al. ............ 713/176

* cited by examiner

SYSTEM AND METHODS FOR TASK MANAGEMENT

BACKGROUND OF THE INVENTION

Conventional managed information environments typically include a plurality of interconnected manageable entities. In such an environment including a storage area network (SAN), the manageable entities may include storage arrays, connectivity devices and database entities, collectively operable to provide information storage and retrieval services to users. In the storage area network, various system administration activities are performed at various times to monitor and maintain the storage area network at an optimal level of operation. In modern managed information environments, system administration often includes invoking and managing a plurality of tasks at various times to perform a variety of system administration and/or overhead activities.

Often, the storage area network is overseen by an operator responsible for ensuring that the various system administration activities are commenced at an appropriate time. In a large storage area network, including many manageable entities, such system administration activities may become formidable. The system administration activities may include, for example, installing new manageable entities, performing backup of existing manageable entities, configuring zoning of the manageable entities, and other performance related activities intended to ensure uninterrupted and timely service to the users of the SAN. In order to avoid burdening the manageable entities in the SAN, the administrative activities are often commenced at idle times, such as overnight, and may be performed in a batch, or background mode to further minimize impact on user based throughput. Such administrative activities often take the form of tasks, which are executable entities for performing various SAN management functions. Therefore, the storage area network is continually monitored and maintained by tasks providing administrative monitoring and maintenance activities and actions.

SUMMARY

Storage area networks typically perform administrative activities for monitoring and maintaining the storage area network in an optimal operational condition. Monitoring and maintenance activities often take the form of tasks, which invoke an application directed at a particular administrative operation or function. In a large storage area network, the number of tasks can be substantial. Further, it is often desirable to run such tasks in an offline or batch mode during periods of low SAN activity, so as to not impede SAN throughput to the user community supported by the SAN.

In the storage area network, software based entities known as agents execute on manageable entities in the network, and exchange messages and commands with other agents and manageable entities. The resulting interconnection of manageable entities and agents is driven by a server responsive to an operator console, which receives operator input and provides operator feedback. However, in a large SAN, there may be many tasks, each operative with the manageable entities and agents in a manner appropriate to the task. For example, tasks may install or terminate agents, may configure manageable entities, and may provide various status information. Therefore, managing a large number of different tasks can be a formidable activity.

The invention defined by the present claims is based, in part, on the observation that various tasks may have different modes of invocation, command manipulation, and results feedback. In such a large SAN, the tasks may be developed by different members of a development team. The different tasks may expect different types of commands for commencing execution, such as interactive or offline, and may have different formats for reporting status and completion, such as log files or message based. Accordingly, it would be beneficial to provide a common framework or infrastructure for task deployment so that the various tasks share common vehicles of invocation and feedback from the console. Such common vehicles allow task management of all tasks in the SAN from a task manager in communication with the various tasks and related object or entities across the SAN.

Configurations of the invention substantially overcome the above described shortcomings presented by multiple tasks deployment by identifying a framework for defining the business logic enveloped in a particular task, and providing a common manner of deploying, or enabling invocation, of the task so as to allow monitoring and controlling the tasks from the server via the task manager. Individual business logic modules, such as Java JAR files, are developed by individual developers, and identified as commands corresponding to a task. Transactions including a set of the commands define an ordered sequence for completing the task. A particular task, identifiable by an operator, includes one or more operations corresponding to the transactions. The operator requests a particular set of tasks, using a hierarchical task selection tree, and the task manager builds an execution tree corresponding to the selection tree to identify the transactions and commands for completing the task. The task manager considers the entire set of tasks in the selection tree, and builds the execution tree to optimize sequential and parallel commands, to reduce redundancies such as multiple opens of the same file or opening multiple sessions, for example, and to avoid collisions or errors resulting from commands accessing shared objects by providing concurrency control.

The task manager builds the optimal execution (transaction) tree from a hierarchical task selection tree specified by a user or operator via a graphical user interface (GUI). Various uses and operations of the GUI manipulating the selection tree are disclosed in copending U.S. patent application Ser. No. 10/872,123, filed Jun. 18, 2004, entitled "SYSTEM AND METHODS FOR A TASK MANAGEMENT USER INTERFACE," assigned to the assignee of the present application. The optimal execution tree results from the hierarchical selection tree, which specifies an ordered execution of tasks. Each task corresponds to an application, which includes the business logic modules for completing the task. Typically, a dialog or wizard associated with the application creates the task, which is a user-visible executable entity for invoking the business logic modules in the application for performing the set of administrative actions called for by the task.

The task manager drives mapping of the operations included in the task selection tree to the transactions built into the execution tree. The execution tree also includes base classes of task definitions, which provide a template for the business logic modules to ensure a common invocation and control path from the console to the tasks performed by the execution tree. The mapped, optimized commands in the execution tree, therefore, represent each of the tasks specified in the task selection tree by the operator. The base classes provided by the task manager ensure conformance to the task manager framework for monitoring and controlling the task from the console. In this manner, a user defined set of tasks are performed, or executed, by the task manager according to a common framework to provide consistent operator control for scheduling, monitoring, ensuring completion, tracking errors and other events associated with the tasks.

In the exemplary configuration discussed further below, the business logic units, typically .jar source code files, may be developed independently of the task or tasks by which they may ultimately be invoked. Such business logic may be developed as a deliverable library, by the software vendor, independently of the development of the tasks. The tasks, and operations therein, are expected to be built from SAN operator input, which invokes the business logic units as needed to complete the task. The task management framework allows the SAN operator to build and/or invoke a task without interfacing with the individual business logic units. Once defined according to the framework, however, the task may be persisted, invoked, scheduled and monitored as needed, and task execution optimized by the execution tree representation.

The task manger infrastructure disclosed in exemplary configurations below includes a method of implementing tasks in a managed information environment and a method of performing a task in a managed information environment. In further detail, implementing the tasks includes identifying a set of tasks, in which each of the tasks corresponds to user defined business logic for performing a particular business function, and determining transactions corresponding to each of the tasks in the set of tasks. The transactions further define a nested set of commands, in which the commands are indicative of execution units containing the user defined business logic. The task manager then builds the execution tree by resolving a mapping of each of the identified tasks to a corresponding determined transaction in the execution tree, in which the execution tree is indicative of the commands in the identified set of tasks. Following building the tree, the task manager persists the execution tree, in which persisting includes storing an indication of the execution units corresponding to the commands in the execution tree as well as the data or arguments with which those commands are to be executed with. In the exemplary configuration, persisting the execution tree is performed by saving names of execution units, in which the execution units correspond to executable classes. The resulting persisted execution tree is operable for retrieving the corresponding execution units for execution.

In the particular exemplary arrangement disclosed herein, mapping the tasks includes identifying, by consulting with the appropriate applications, transactions and commands corresponding to a particular task, and which satisfy execution dependencies, including serial and parallel relationships between the ordered commands. The resulting mapped execution tree optimizes the ordering according to associations between the identified commands, such as by identifying and consolidating redundant functions performed by the ordered commands. Further optimization while executing the tree includes avoiding potential resource contention and throttling operations to mitigate competition for processing resources. In particular configurations, optimizing includes identifying a Quality of Service (QOS) criteria for each of the commands and ordering the execution of the commands in response to the QOS criteria. The identified set of tasks define a nested execution order, in which identification involves traversing the nested execution order to identify a hierarchy of operations. The resulting ordering of the commands corresponds to the hierarchy of operations. In particular arrangements, a user or operator defines the set of tasks according to at least one dialog, in which the dialog corresponds to the application performing the task.

Particular exemplary configurations define the business logic, which are the user defined business logic code, typically for performing the various business or enterprise related operations for which the task is directed. The framework rules further define base classes, such as C++ or Java based classes, in which the classes of business logic may extend, or build from, the base classes. The base classes, therefore, are for the common expected behavior of all commands which 'extend' these base classes and are actually the business logic code.

Performing, or executing a task in the managed information environment, includes first defining the set of tasks for execution according to a hierarchical task list and persisting an execution tree corresponding to the defined tasks, in which the execution tree is indicative of an ordered set of transactions and commands corresponding to the defined tasks. A loader then identifies the persisted execution tree, in which the execution tree is indicative of execution units corresponding to the commands, and loads the execution units corresponding to the commands in the execution tree. An execution engine executes the business logic contained in the execution units for performing the corresponding commands, in which the commands collectively perform the transactions for completing the defined task. In the exemplary arrangement, the loader retrieves the persisted execution tree from a storage repository, and executes, in the specified order, each of the commands in the task by invoking the corresponding execution units according to the execution tree.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
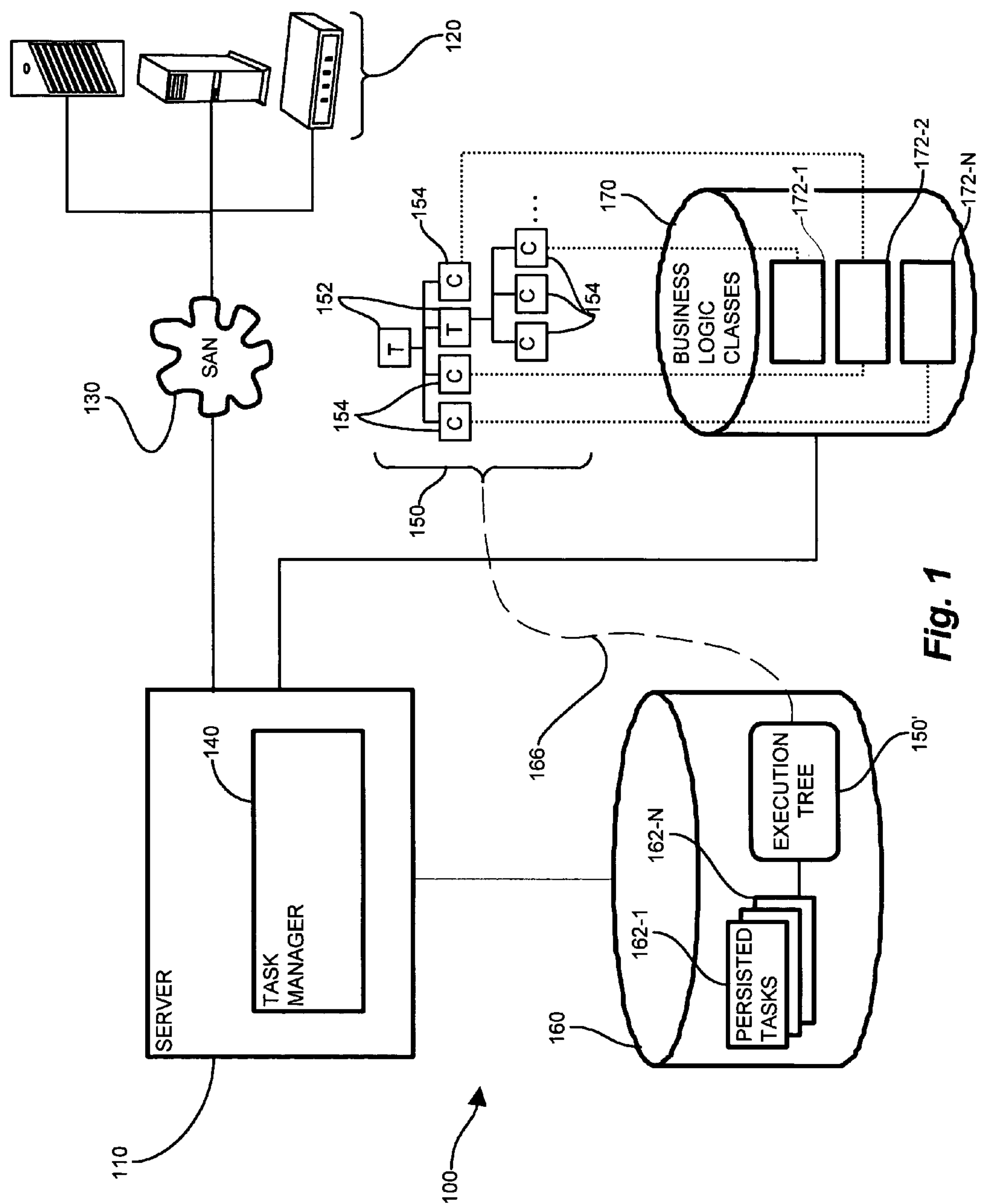
FIG. 1 is a context diagram of an exemplary managed information environment including a storage area network and suitable for use with the task management mechanism.

Configurations of the invention identify a framework, or infrastructure, for defining the business logic enveloped in a particular task, and provide a common manner of deploying, or enabling invocation, of the task so as to allow monitoring and controlling the tasks from the server via the task manager. Individual business logic modules, such as Java JAR files, are developed by individual developers, and identified as commands corresponding to a task. Transactions including a set of the commands define an ordered sequence for completing the task. A particular task, identifiable by an operator, includes one or more operations corresponding to the transactions. The operator requests a particular set of tasks, using a hierarchical task selection tree, and the task manager builds an execution tree corresponding to the selection tree to identify the transactions and commands for completing the task. The task manager considers the entire set of tasks in the selection tree, and builds the execution tree to optimize sequential and parallel commands, and to reduce redundancies such as multiple opens of the same file, for example. While the tree is being executed, it also performs various operations required by the system, such as concurrency control and/or authorization verification.

The task manager drives building the optimal execution (transaction) tree from the hierarchical task selection tree specified by a user or operator via a graphical user interface (GUI). The optimal execution tree results from the hierarchical selection tree, which specifies an ordered execution of tasks. Each task corresponds to an application, which includes the business logic modules for completing the task as well as the logic to map a set of tasks pertaining to this application into an optimized execution tree. Typically, a dialog or wizard associated with the application creates the task, which is the user visible executable entity for invoking the business logic modules in the application for performing the set of administrative actions called for by the task.

The task manager therefore achieves or calls for mapping the operations included in the task selection tree to the transactions built into the execution tree. The execution tree also includes base classes of task definitions, which provide a template for the business logic modules to ensure a common invocation and control path from the console to the tasks performed by the execution tree. The mapped, optimized commands in the execution tree, therefore, represent each of the tasks specified in the task selection tree by the operator. The mapping achieved by the task manager ensures conformance to the task manager framework for monitoring and controlling the task from the console. In this manner, a user defined set of tasks are performed, or executed, by the task manager according to a common framework to provide consistent operator control for scheduling, monitoring, ensuring completion, and tracking errors and other events associated with the tasks.

FIG. 1 is a context diagram of an exemplary managed information environment 100 including a storage area network 130 and suitable for use with the task management mechanism. Referring to FIG. 1, the managed information environment 100 includes a server 110 coupled to manageable entities 120 via the storage area network (SAN) 130. The server 110 includes a task manager 140 for building an execution tree 150 indicative of the transactions 152 and commands 154 included in each task 162-1 . . . 162-N (162 generally). The commands 154 correspond to business logic classes 170 including business logic units 172-1 . . . 172-N (172 generally) for performing the commands 154. Multiple commands 154 define a transaction 152, as indicated in the execution tree 150. A task repository 160 stores the execution tree 150 representation in a persisted form along with the corresponding persisted tasks 162, as shown by dotted line 166. The persisted execution tree 150' is operable for subsequent execution for fulfilling the task or tasks called for, as discussed further below.

Figure 2:
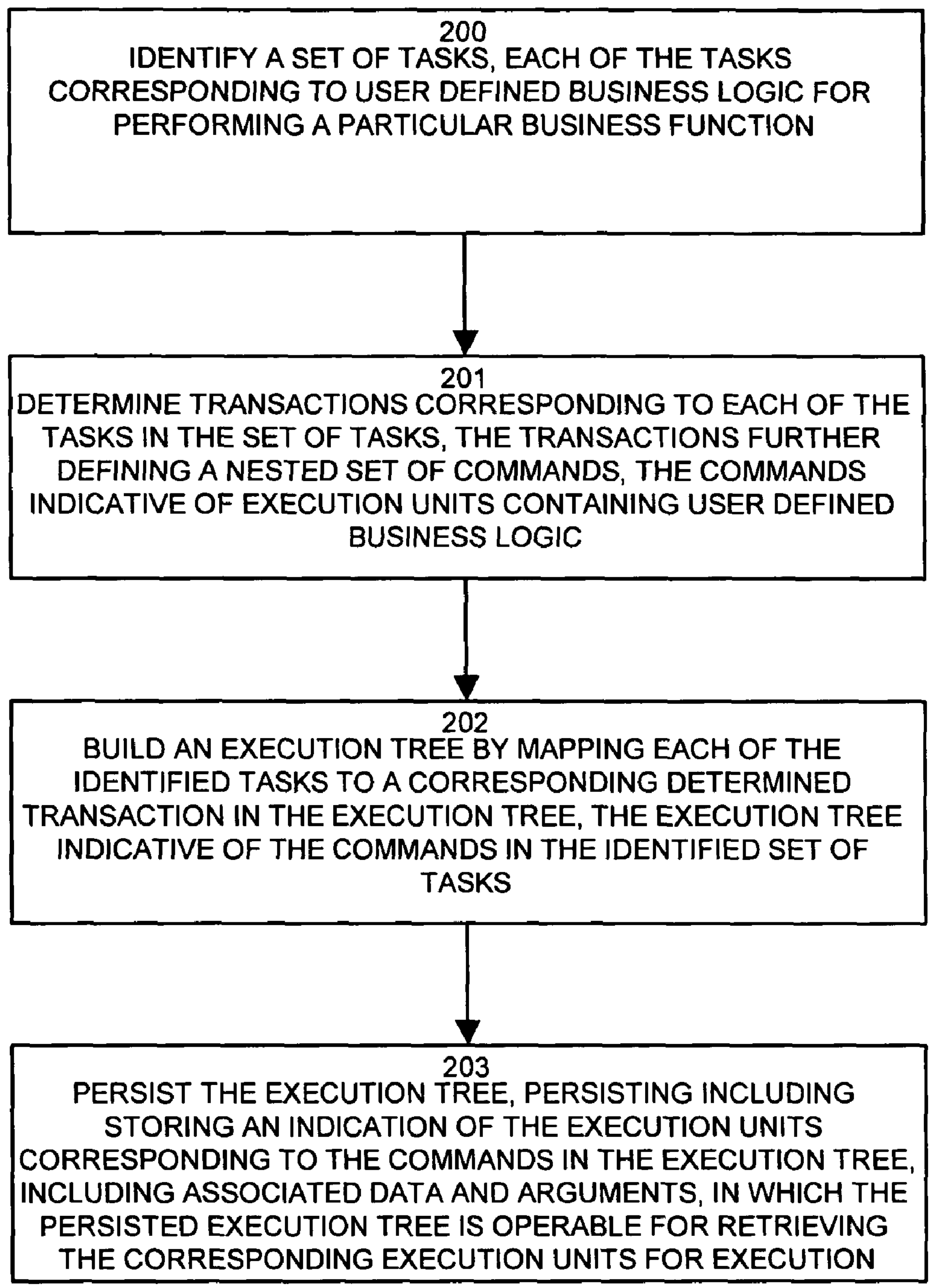
FIG. 2 is a top-level flowchart of task management as described herein.

FIG. 2 is a top-level flowchart of task management as described herein. Referring to FIGS. 1 and 2, the method of implementing tasks in a managed information environment includes identifying a set of tasks 162-1 . . . 162-N, in which each of the tasks correspond to user defined business logic 170 for performing a particular business function included in the task 162, as depicted at step 200. In the exemplary configuration shown, the business logic 170 corresponds to a code library of executable code. The task manager 140 invokes or determines transactions 152 corresponding to each of the tasks 162 in the set of tasks 162-N, in which the transactions 152 further define a nested set of commands 154, in which each is indicative of execution units 172 containing user defined business logic, as shown at step 201. The task manager, therefore, solicits or drives the application to return the execution tree, by providing the application the tasks in context. Accordingly, the task manager invokes, or drives the application via a method to achieve the mapping. In the exemplary configuration, the execution units 172 are executable code compiled from source code objects (not specifically shown) as are known in the art.

The application 112 corresponding to the tasks builds the execution tree 150 by mapping each of the identified tasks 162-N to a corresponding determined transaction 152 in the execution tree 150, the execution tree 150 being indicative of the commands 154 in the identified set of tasks 162-N, as depicted at step 202. Mapping includes identifying the operations included in each task 162, generating a transaction node 152 in the transaction tree 150, and generating one or more command nodes 154 corresponding to the transaction 152. In the exemplary configuration, each task 162 includes a plurality of operations. The application 112 creates a transaction 152 in the execution tree 150 for each operation. Each operation further includes one or more commands 154, which the task manager 140 maps to command nodes 154 in the execution tree. Thus, transactions 152 include one or more commands 152, and each transaction corresponds to an operation from a task 162. Therefore, the task manager 140 provides a (common) interface for all applications to build the execution tree 150 in a manner which facilitates access and execution by each of the applications 112.

The task manager 140 then persists the execution tree 150 in the repository 160, in which persisting includes storing an indication of the execution units 170 corresponding to the commands 154 in the execution tree 150, including the data and/or arguments required at execution time, as disclosed at step 203. The persisted execution tree 150' is then operable for subsequently retrieving the corresponding execution units 172 for execution. Therefore, the execution units 172-N, such as code objects invoked by a particular execution tree 150 for performing the commands 154 in the tree are persisted, or stored, with the execution tree 150' to enable retrieval and execution of the tasks 162-N at a subsequent time.

Figure 3:
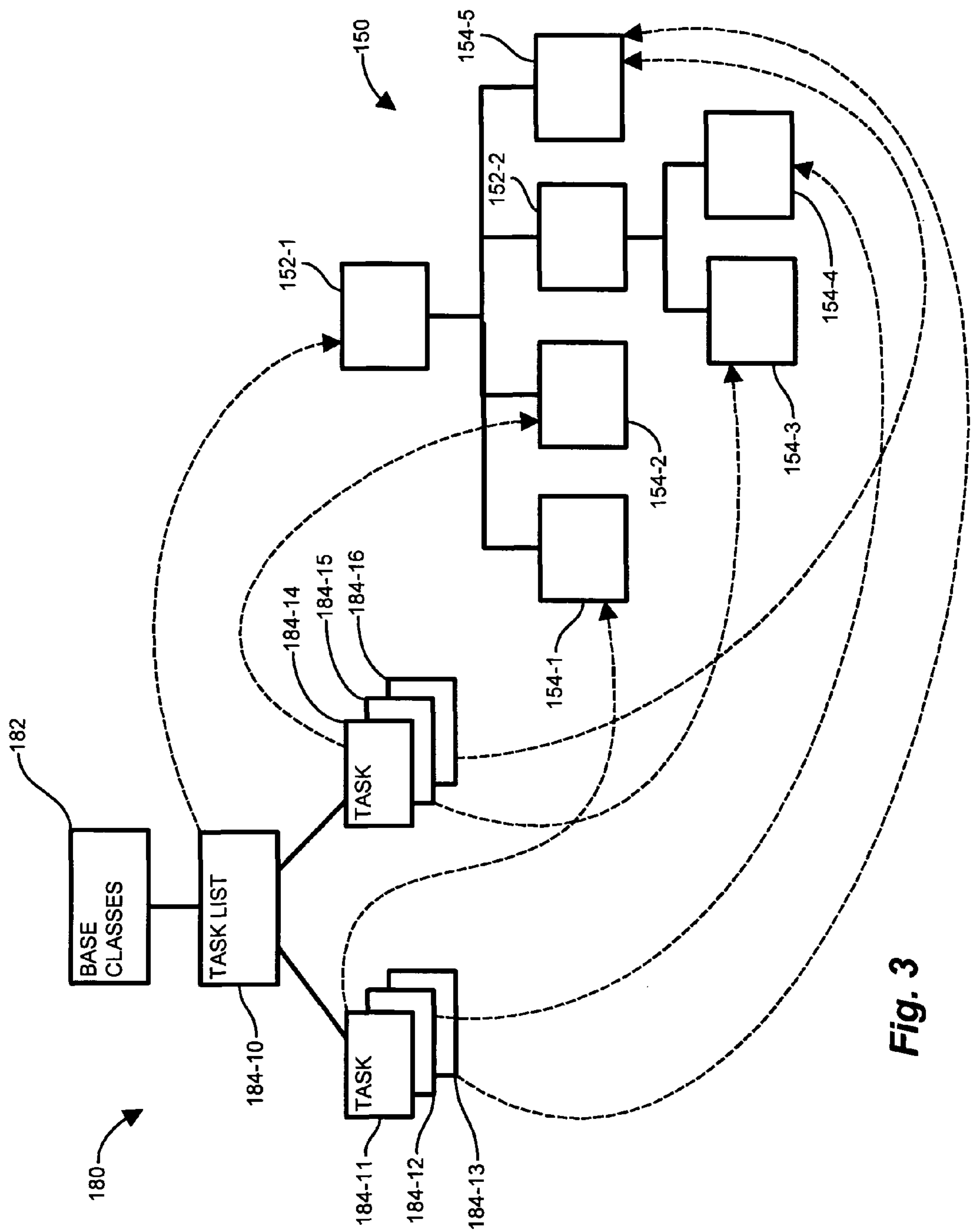
FIG. 3 shows a task selection tree mapping to an execution tree.

FIG. 3 shows a task selection tree 180 mapping to an execution tree 150 in greater detail. Referring to FIGS. 1 and 3, the task selection tree 180 is a user defined set of tasks 162 and task lists 184 in a hierarchical order. A task list 184 is a nested set of tasks 184. In the exemplary configuration shown, the task selection tree 180 may be defined by employing the user interface disclosed in the copending U.S. patent application cited above. The tasks 184 in the task selection tree 180 correspond to the persisted tasks 162 in the resulting execution tree. The task selection tree 180, therefore, corresponds to the user view of a particular set of tasks 162, and the execution tree 150 represents the SAN internal system task manager view, optimized for efficient processing. Accordingly, the server 110 receives the task selection tree 180 and maps the tasks 184 to the generated execution tree 150, further identifying the commands 154 performed by the operations 154, and generating the execution tree 150 to include transactions 152 each including the operations 154 in an optimized arrangement. The operations 154 are created with the task 184 and symbolize steps from the user perspective from which the task is composed. The operations 154 of a task 184 are therefore conceived at the time of the user creating the task from the application dialog 116, or wizard. Accordingly, the task manager 140 provides the API for the application 114 to build the task 184 and corresponding operations 154. Note that each operation 186 may, but need not, map to one or more commands 152.

In the example shown, the task list 184 maps to the top level transaction 152-1 in the execution tree 150. Task 184-11 maps to command 154-1, and task 184-14 maps to command 154-2. Tasks 184-12 and 184-15 map to commands 154-4 and 154-3, respectively, collectively defined as transaction 152-2. Note that the execution tree is further operable to identify parallel and serial execution of the command, as shown by commands 154-3 and 154-4 under transaction 152-2, may indicate parallel execution. Further, the transactions 152-1 may likewise identify serial dependencies among tasks and designate sequential execution. For example, tasks 184-11 and 184-14 may be identified as sequential commands. Tasks 184-13 and 184-16 both map to command 154-5, indicating similar functions in each, such as a close or terminate command.

The optimization provided by mapping the task list tree 180 to the execution tree 150 may be provided, by way of example only, as follows. Tasks 184-11 and 184-14 each perform a distinct open operation, and therefore are mapped first in a sequential manner. Tasks 184-12 and 184-16 each perform an install operation on separate manageable entities, and are therefore appropriate for parallel execution as commands 154-3 and 154-4. Finally, a close operation specified by tasks 184-13 and 184-15 is similar, and is effectively mapped as a single command 154-5, following completion of the install commands 152-3, 152-4.

Figure 4:
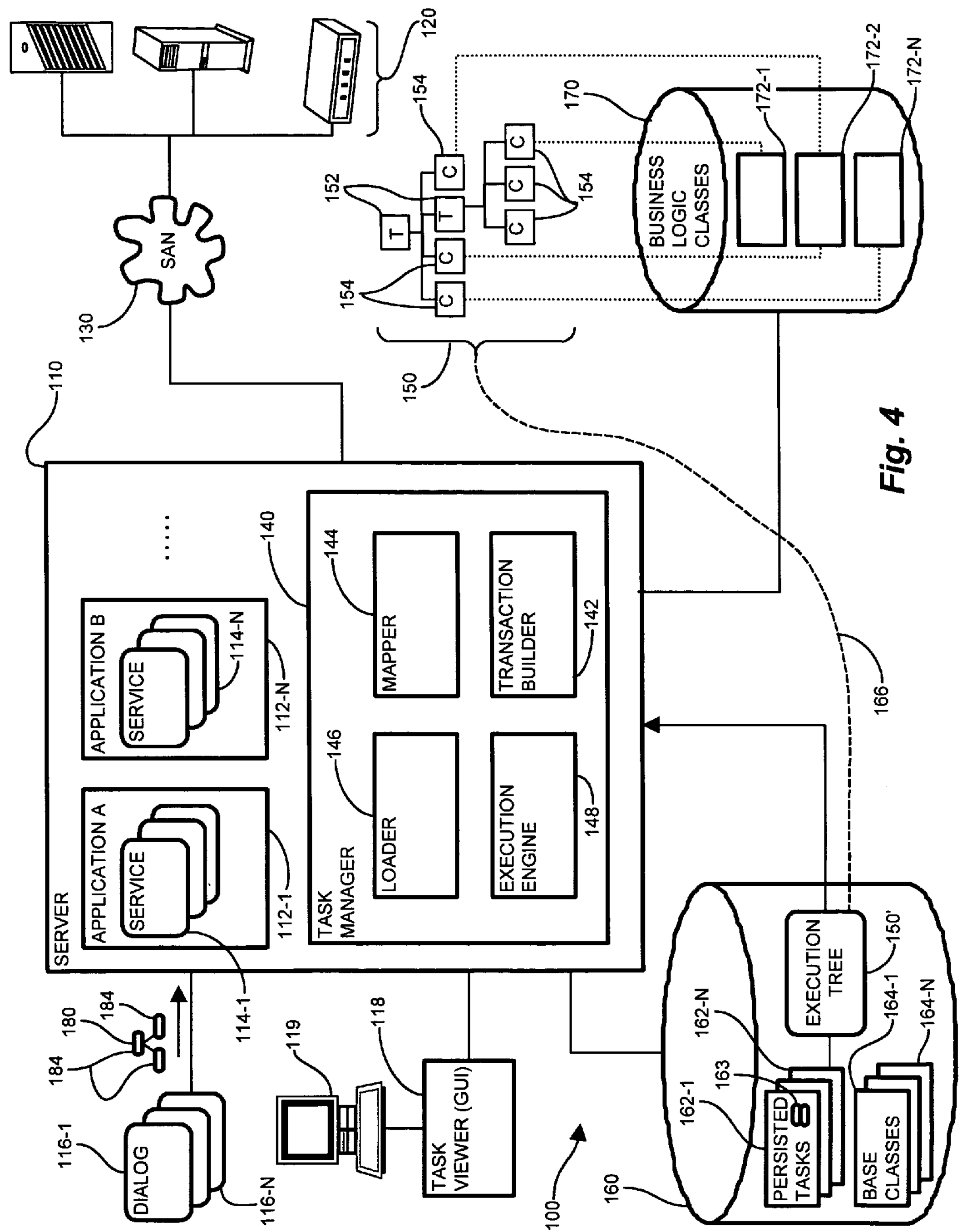
FIG. 4 is a block diagram of the task manager in the exemplary managed information environment operable according to the system of the present invention.
Figure 5:
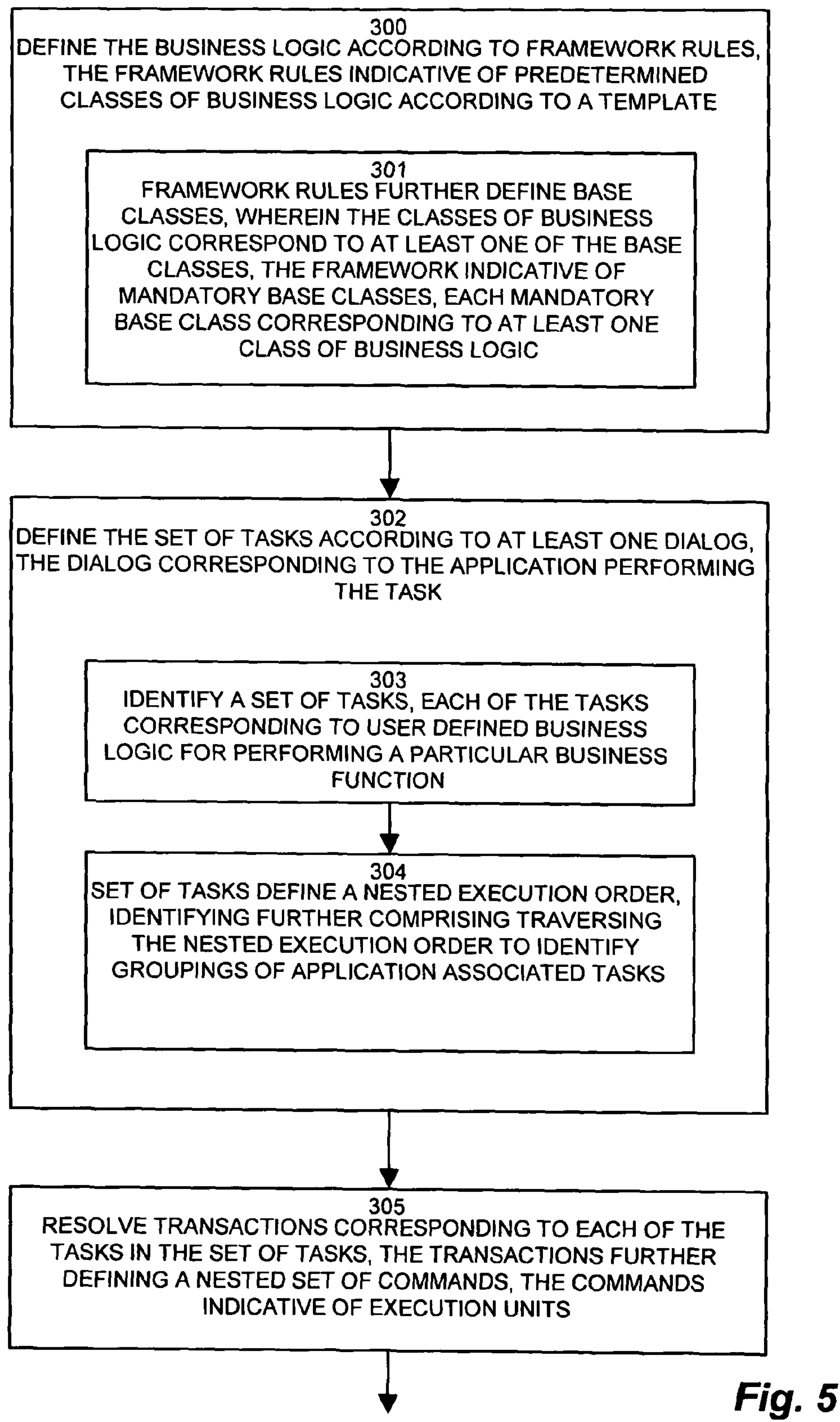
FIGS. 5-7 are a flowchart of task definition of the task management infrastructure mechanism in greater detail and FIG. 8 is a flowchart of task execution using the task management infrastructure.
Figure 6:
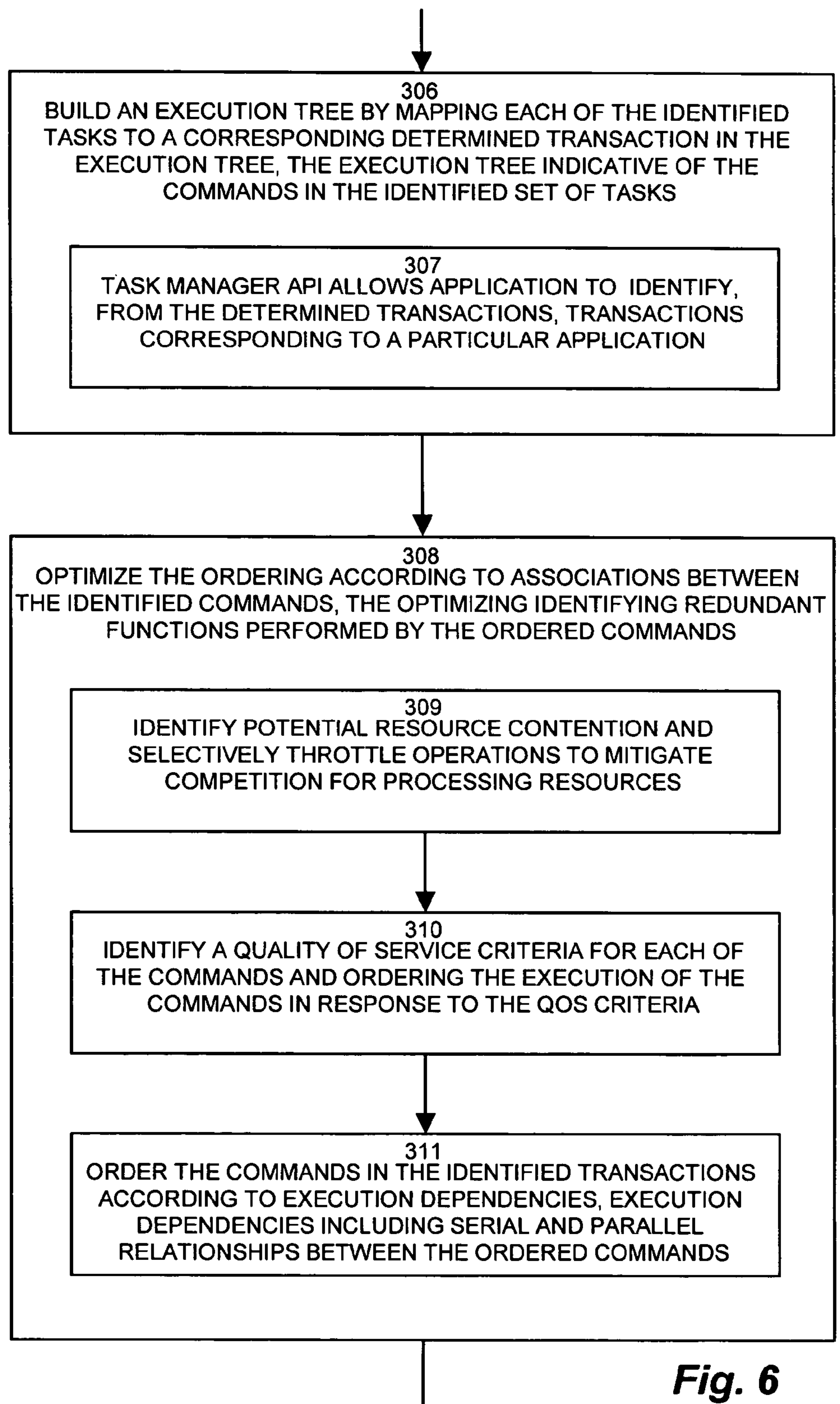
Figure 7:
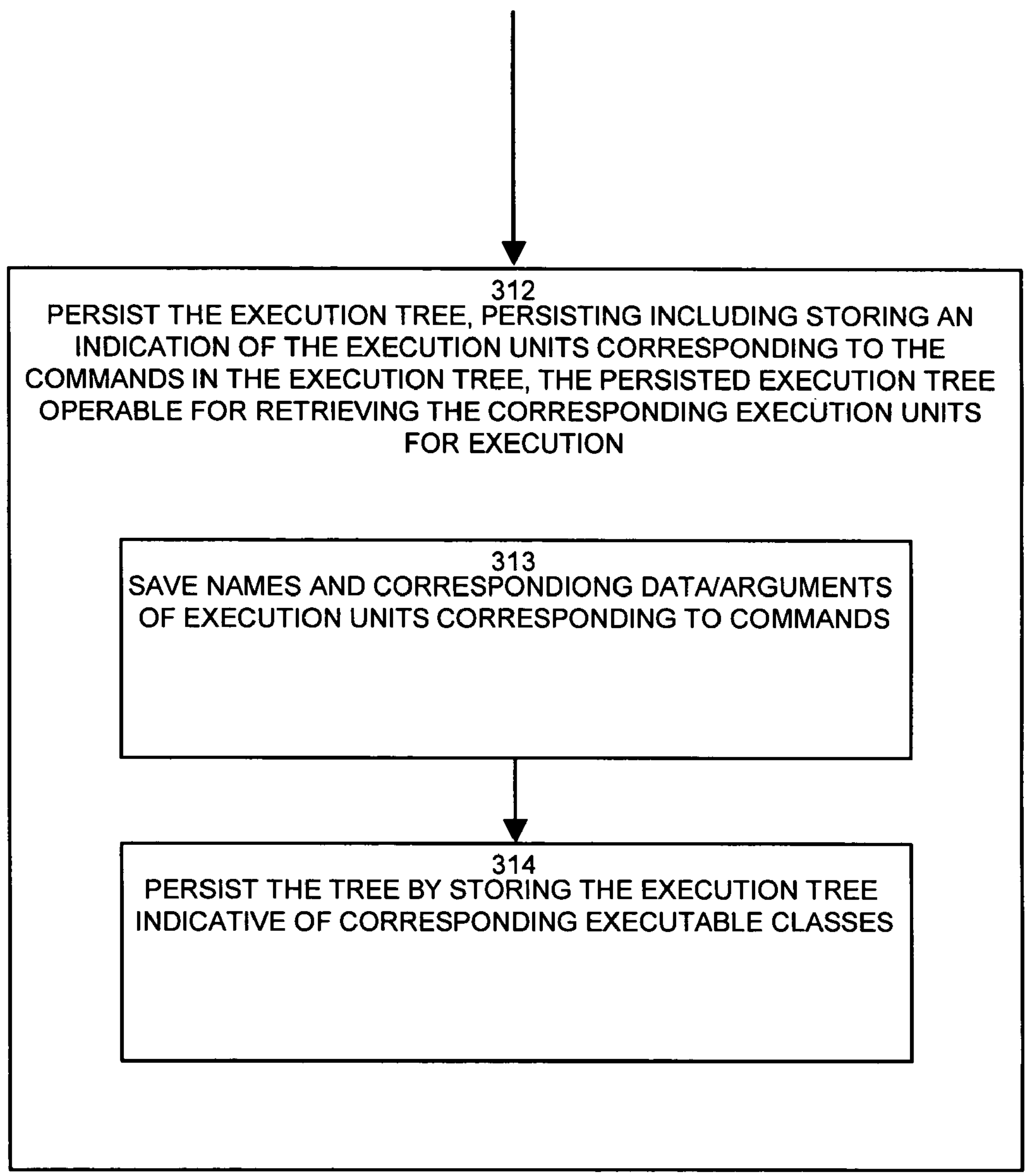

FIG. 4 is a block diagram of the task manager 140 in the exemplary managed information environment as in FIG. 1, in greater detail, operable according to the system of the present invention. Referring to FIG. 4, the server 110 includes a plurality of applications 112-1 . . . 112-N (112 generally), each providing one or more services 114-1 . . . 114-N (114 generally). Each of the applications 112 provides one or more dialogs 116 operable to create the tasks 184. In the exemplary arrangement illustrated, a user or operator employs the interactive dialogs 116, also known as wizards, for creating the selection tree 180 including the tasks 184. Alternate configurations may employ other mechanisms, such as automated task generation. The persisted tasks 162, as indicated above, are executable entities, from the user perspective, for invoking the application 112 to perform the operations included in the task 162. Further, the tasks 162 employ base classes 164 for providing basic common classes generally applicable to the tasks 162, such as for initializing a task, validating the task and terminating a task, to name several.

The task manager 140 includes a transaction builder factory 142 for building transactions from constituent tasks, by consulting with and/or delegating to application specific builders, registered with the task manager. A mapping interface 144 allows the transaction builders to map the operations of the tasks 162 to the transactions 152 and commands 154 in the execution tree 150, as shown by dotted line 166. A loader 146 is operable to load the persisted execution tree 150' referencing the persisted tasks 162-N as transactions 152 and commands 154, and an execution engine 148 executes the execution tree 150 to perform the corresponding tasks 162. A task viewer 118 is operable to view the status of the executing, or previously executed, tasks via a user display 119.

FIGS. 5-8 are a flowchart of task definition of the task management infrastructure mechanism in greater detail. Referring to FIGS. 4-8, a software developer initially defines the business logic according to framework rules, in which the framework rules are indicative of predetermined classes 164 according to the infrastructure, such as a template (not specifically shown), as depicted at step 300. The template specifies certain base classes, or code files, which the framework expects, such as classes that will determine the behavior of execution of the transaction tree. Therefore, the framework rules further define base classes 164, in which the classes of business logic 170 correspond to at least one of the base classes 164, the template indicative of mandatory base classes, each mandatory base class corresponding to at least one class of business logic 170, as shown at step 301. In the exemplary configuration, the base classes 164 correspond to code object classes represented by a source code file in C++, C or Java, for example. The business logic units 172 also correspond to source code files and include or inherit the base classes 164, which provide methods such as parallel and serial execution ordering, initializing, teardown or termination, and event handling, to name several.

A user defines the set of tasks 162-N according to at least one dialog 116, in which the dialog 116 corresponds to the application 112 performing the task, as shown at step 302. As indicated above, the tasks 162 are defined according to dialogs 116 provided by the application 112 they represent. Typically, the user defines a task tree 180 indicative of a hierarchical ordering of multiple tasks 184. The task selection tree 180 development is more fully described in the copending U.S. patent application cited above.

The task selection tree 180 identifies tasks 184, to be persisted in the set of tasks 162-1 . . . 162-N, in which each of the tasks 162 corresponds to user defined business logic units 172 for performing a particular business function, as depicted at step 303. As indicated above, the set of tasks 184 included in the selection tree 180 define a nested execution order. The transaction builder factory 142 traverses the nested execution order to identify groupings of application associated tasks, and invokes the applications' transactions builders, also offered in 170 as part of the business logic code, and conforms to the framework template for building a transaction tree, as shown at step 304. The transaction builder factory 142 therefore resolves the transactions 152 corresponding to each of the tasks 162 in the set of tasks 162-N, in which the transactions 152 further defining a nested set of commands 154, and wherein the commands 154 are indicative of execution units 172 in the business logic classes 170 containing user defined business logic, as shown at step 305.

The transaction builder factory 142 builds the execution tree 150 by driving the creation of transaction 152 nodes and command 154 nodes, and the mapper 144 then maps each of the identified tasks to a corresponding determined transaction in the execution tree 150, in which the execution tree 150 is indicative of the commands 154 in the identified set of tasks 162-N, as depicted at step 306. The mapping, therefore, examines the set of tasks 162-N enumerated in the task selection tree 180, and generates the corresponding execution tree 150 having transactions 152 including commands 154 mapped from the operations 186 of the tasks 162 in the task selection tree 184, as described above with respect to FIG. 3. The mapper 144 is the API task manager which provides for an application 112 to identify, from the determined transactions 152, transactions 152 corresponding to a particular application 112, as shown at step 307, and maps the operations 163 such that the resulting execution tree 150 corresponds to commands 154 performable by the application 112. Accordingly, each execution tree 150 performs commands 154 via a particular application 112 corresponding to the execution tree 150.

Using the mapper 144, an application optimizes, or coalesces, the ordering of the transaction 152 and commands 154 according to associations between the identified commands 154, in which the optimizing identifies redundant functions performed by the ordered commands 154, as disclosed at step 308. For example, as described above, identifying commands executable in parallel, and identifying common close operations, streamline execution of commands 154 and mitigate duplication. Such optimizing may further include identifying potential resource contention and selectively throttling operations to mitigate competition for processing resources, as depicted at step 309. For example, a particular task selection 180 attempts to install 50 agents, five on each of 10 hosts. Performance of the corresponding execution tree 150 may tend to overwhelm the hosts with starting 5 simultaneous agents. Accordingly, throttling suggests starting 3 agents, followed by the remaining 2, so as to avoid a sudden surge of processing demands by the execution tree 150.

Further optimization may include identifying a Quality of Service criteria for each of the commands, and ordering the execution of the commands in response to the QOS criteria, as depicted at step 310. The QOS criteria, therefore, attaches a QOS level or metric to each of the commands 154 to serve as a prioritization guideline for execution of each command 154. Optimization may further include ordering the commands 154 in the identified transactions 152 according to execution dependencies, as shown at step 311. Such execution dependencies include serial and parallel relationships between the ordered commands 154, as described above.

The task manager 140 persists the generated execution tree 150 in the repository 160, in which persisting includes storing an indication of the execution units 172 corresponding to the commands 154 in the execution tree 150. The resulting persisted execution tree 150' is operable for retrieving the corresponding execution units 172 for execution, as depicted at step 312. Persisting, or storing the execution tree 150 to enable subsequent execution of the ordered tasks 162 therein, involves storing the transactions 154 and commands 152, the base classes 164, and at least an association to the business logic units 172 invoked by the tasks 162. In the exemplary configuration, the task manager 140 saves the names of the execution units 172 corresponding to the commands 154 in the execution tree 150, together with the data/arguments required in order to execute the commands, as depicted at step 313. The task manager persists the tree 150 by storing the execution tree 150 and corresponding executable classes 170, as shown at step 314. Therefore, the persisted execution tree 150' indicates the executable code units 172 (objects) and the order for executing the objects to perform the tasks 162 called for by the task selection tree 180.

Figure 8:
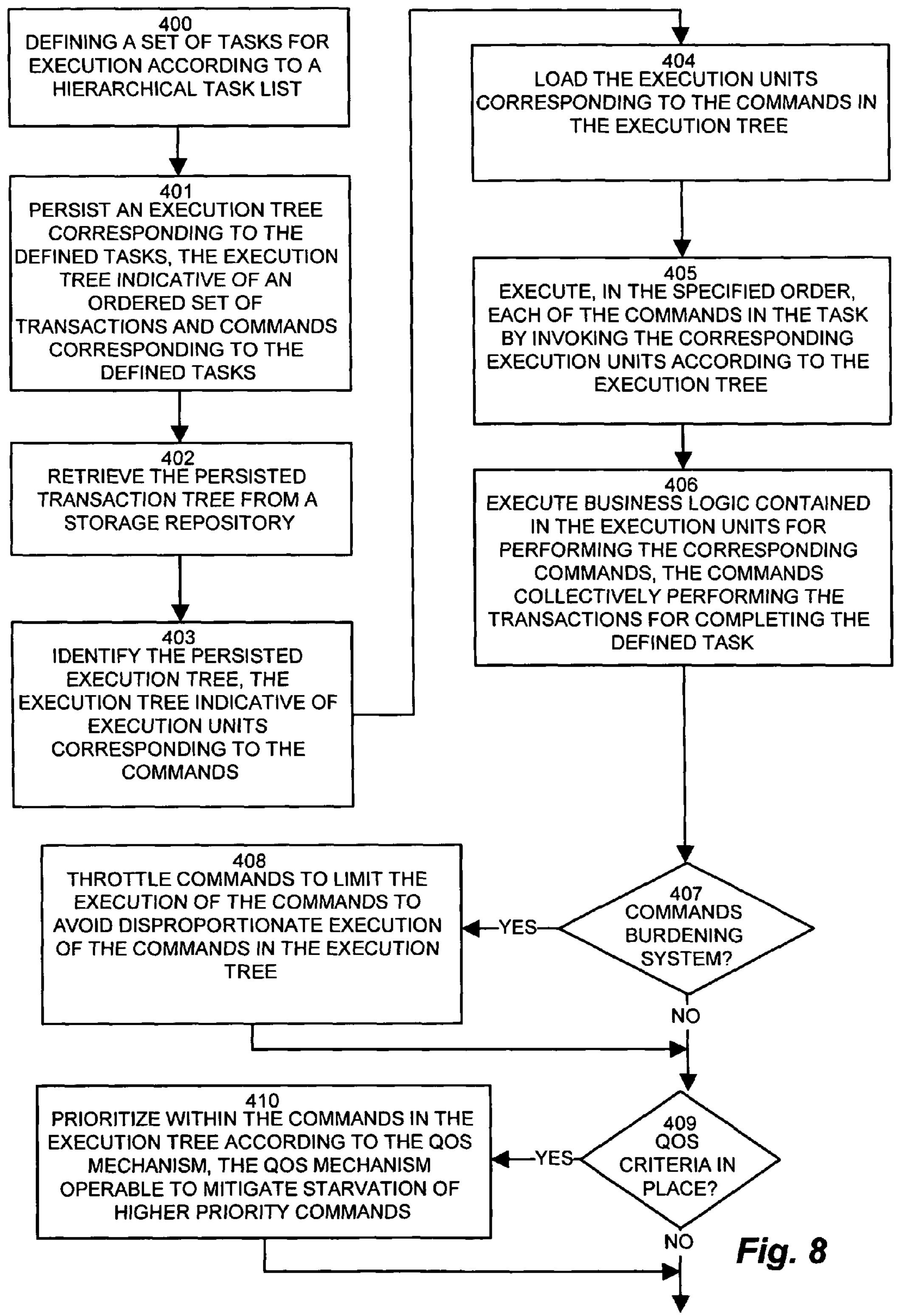

FIG. 8 is a flowchart of task execution using the task management infrastructure for executing, or performing, a persisted execution tree 150'. Referring to FIGS. 4 and 8, the persisted execution tree 150' results from defining a set of tasks 162 for execution according to a hierarchical task list 180, as depicted at step 400, and persisting the execution tree 150' corresponding to the defined tasks 162, in which the persisted execution tree 150' is indicative of an ordered set of transactions 152 and commands 154 corresponding to the defined tasks, as disclosed at step 401, described above. The loader 146 retrieves the persisted transaction tree 150' from the storage repository 160, as shown at step 402, and identifies the execution units 170 specified in the persisted execution tree 150', the execution units 170 corresponding to the commands 154, as depicted at step 403.

The loader 146 then loads the execution units 172 corresponding to the commands 154 in the execution tree 150 from the business logic classes 170 repository, as depicted at step 404. Therefore, the persisted execution tree 150' identifies the execution units 172, or classes, to be loaded for performing the commands 154 in the tree 150. The loader 146 loads the identified classes 172, derived from (or which extend) the base classes 164, to enable execution by the execution engine 148. The execution engine 148 executes, in the specified order, each of the commands 154 in each of the tasks 162 by invoking the corresponding execution units 172 according to the execution tree 150, as disclosed at step 405. The execution engine 148 first invokes an authorization check on each of the commands (authorization check service is available for commands and tasks, not shown) and then executes the business logic (i.e. instructions) contained in the execution units 172 for performing the corresponding commands 154, in which the commands 154 collectively perform the transactions 152 for completing the defined task 162 or tasks called for by the selection tree 180, as depicted at step 406.

During execution, as discussed above, a check is performed to determine if throttling of the executing commands 154 is appropriate to maintain acceptable system demand resulting from the executing tree 150, as depicted at step 407. If so, then executing further includes throttling, in which the throttling mechanism is operable to limit the execution of the commands to avoid disproportionate execution of the commands in the execution tree 150, as disclosed at step 408.

A further check is performed, as depicted at step 409, to determine if a Quality of Service prioritization is applicable to the executing commands. If so, then the execution engine 148 prioritizes the commands in the execution tree 150 according to the QOS mechanism, in which the QOS mechanism operable to mitigate starvation of higher priority commands. Alternate configurations are amenable to a variety of QOS implementations, which avoid starving higher service levels at the expense of lower priority (quality) levels, as are known in the art.

The task management framework and mechanism disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for task management as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for task management has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer implemented method of implementing tasks in a managed information environment comprising a memory coupled to a processor for performing the computer implemented method and executing instructions for performing the computer implemented method, the method comprising:

identifying a set of tasks, each of the tasks corresponding to user defined business logic for performing a particular business function;

determining transactions corresponding to each of the tasks in the set of tasks, the transactions further defining a nested set of commands, the commands indicative of execution units containing user defined business logic;

building an optimized execution tree by mapping each of the identified tasks to a corresponding determined transaction in the execution tree, the execution tree indicative of the commands in the identified set of tasks, optimizing further comprising:

identifying hosts in a storage area network for performing the commands in the execution tree, each of the hosts responsive to a SAN (storage area network) manager;

identifying potential resource contention resulting from commands that consume common host resources redundantly including a first command and a second command, the second command similar to the first command, the commands common to multiple tasks, the redundant commands being duplicative open or close operations performed on the same file and mapped together as the same command thus eliminating a duplicative command;

selectively throttling operations by staggering command execution to mitigate competition for processing resources and eliminating the duplicate commands from the execution tree; and persisting the optimized execution tree, persisting including storing an indication of the execution units corresponding to the commands in the execution tree, the persisted execution tree configured for retrieving the corresponding execution units for execution.

2. The method of claim 1 wherein mapping includes identifying, from the determined transactions, transactions corresponding to a particular application; and ordering the commands in the identified transactions according to execution dependencies, execution dependencies including serial and parallel relationships between the ordered commands.

3. The method of claim 2 further comprising optimizing the ordering according to associations between the identified commands, the optimizing identifying redundant functions performed by the ordered commands.

4. The method of claim 2 wherein set of tasks define a nested execution order, identifying further comprising traversing the nested execution order to identify groupings of application associated tasks.

5. The method of claim 4 further comprising defining the business logic according to framework rules, the framework rules indicative of predetermined classes according to a template.

6. The method of claim 5 wherein the framework rules further define base classes, wherein the classes of business logic correspond to at least one of the base classes, the template indicative of mandatory base classes.

7. The method of claim 6 further comprising defining the set of tasks according to at least one dialog, the dialog corresponding to the application performing the task.

8. The method of claim 7 wherein persisting the execution tree further comprises saving names of execution units corresponding to commands, the execution units corresponding to executable classes; and storing the execution tree.

9. The method of claim 1 further comprising receiving the identified tasks from a graphical user interface, the identified tasks corresponding to business logic contained in applications and invoked according to the application tree for completing each of the tasks in the set of identified tasks.

10. The method of claim 1 wherein the determined transactions define a hierarchical task selection tree, the hierarchical task selection tree including the tasks and commands, each task having at least one command, further comprising:

identifying serial dependencies between commands, the serial dependencies indicating a sequential ordering between command execution; and identifying parallel independence between commands, parallel independence indicating commands executable concurrently.

11. The method of claim 10 wherein the identified serial and parallel dependencies optimize the execution tree, and persisting the execution tree comprises storing the optimized execution tree in an executable form, the executable form responsive to a loader for loading and execution, further comprising:

loading the execution tree into a server memory, the server coupled to a Storage Area Network (SAN) for performing SAN management tasks; and executing the optimized tasks and commands.

12. The method of claim 11 wherein the executed tasks correspond to applications including business logic, the application invoking agents for performing management of SAN manageable entities.

13. The method of claim 1 further comprising throttling by starting a predetermined subset of agents called for by the execution tree, followed by starting a remainder of the agents called for by the execution tree, such that a sudden surge of processing demands by the execution tree is mitigated.

14. The method of claim 1 further comprising:

identifying a Quality of Service (QOS) criteria for each of the commands; and ordering the execution of the commands in response to the QOS criteria, the QOS level defining a prioritization guideline for execution of each command.

15. A method of performing a task in a managed information environment, comprising:

defining a set of tasks for execution according to a hierarchical task list;

persisting an optimized execution tree corresponding to the defined tasks, persisting including storing the execution tree indicative of an ordered set of transactions and commands corresponding to the defined tasks, the optimized execution tree identifying potential resource contention resulting from commands that consume common host resources redundantly, the redundant processing including a first command and a second command, the second command duplicative of the first command, the commands common to multiple tasks, persisting further including mapping the common commands together as the same command for eliminating duplicative commands, the first and second commands being duplicative open or close operations performed on the same file;

identifying hosts in a storage area network for performing the commands in the execution tree, each of the hosts responsive to a SAN (storage area network) manager;

selectively throttling operations by staggering command execution to mitigate competition for processing resources;

identifying the persisted optimized execution tree, the execution tree indicative of execution units corresponding to the commands;

loading the execution units corresponding to the commands in the execution tree;

executing business logic contained in the execution units for performing the corresponding commands, the commands collectively performing the transactions for completing the defined task.

16. The method of claim 15 further comprising:

retrieving the persisted execution tree from a storage repository; and executing, in the specified order, each of the commands in the task by invoking the corresponding execution units according to the execution tree, executing further including providing concurrency control among the commands in the tree.

17. The method of claim 16 wherein executing further comprises throttling, the throttling mechanism is configured to limit the execution of the commands to avoid disproportionate execution processing demands by the commands in the execution tree.

18. The method of claim 17 further comprising a QOS (Quality of Service) mechanism, wherein executing further comprises prioritizing within the commands in the execution tree according to the QOS mechanism, the QOS mechanism is configured to mitigate starvation of higher priority commands.

19. A device for implementing tasks in a managed information environment comprising:

a memory to store instructions;

a processor to execute the instructions in the memory;

an interface responsive to the processor and configured to communicate with manageable entities in the managed information environment;

a task manager responsive to the instructions and configured to identify a set of tasks, each of the tasks corresponding to user defined business logic for performing a particular business function;

a transaction builder factory is configured to determine transactions corresponding to each of the tasks in the set of tasks, the transactions further defining a nested set of commands, the commands indicative of execution units containing user defined business logic; and a mapper is configured to build an optimized execution tree by mapping each of the identified tasks to a corresponding determined transaction in the execution tree, the execution tree indicative of the commands in the identified set of tasks, optimizing further comprising:

identifying hosts in a storage area network for performing the commands in the execution tree, each of the hosts responsive to a SAN (storage area network) manager;

identifying potential resource contention resulting from commands that consume common host resources redundantly, the redundant commands being duplicative open or close operations performed on the same file and mapped together as the same command thus eliminating duplicative commands; and selectively throttling operations by staggering command execution to mitigate competition for processing resources, the transaction builder further configured to persist the execution tree by storing an indication of the execution units corresponding to the commands in the execution tree, the persisted execution tree is configured for retrieving the corresponding execution units for execution; and the transaction builder factory further configured to invoke the corresponding application to optimize the ordering according to associations between the identified commands, the optimizing identifying redundant functions performed by the ordered commands and mapping commands of the redundant functions together as the same command thus eliminating duplicative commands.

20. The device of claim 19 wherein the execution engine is further configured to identify a Quality of Service (QOS) criteria for each of the commands and ordering the execution of the commands in response to the QOS criteria, and the transaction builder factory is configured to optimize by identifying a first command and a second command, the second commands duplicative of the first command, the commands common to multiple tasks, and eliminating the duplicative commands.

21. The device of claim 19 wherein set of tasks define a nested execution order, wherein the execution engine is further configured to traverse the nested execution order to identify a hierarchy of operations, the ordering of the commands corresponding to the hierarchy of operations.

22. The device of claim 21 wherein the business logic conforms to framework rules, the framework rules indicative of predetermined classes according to a template.

23. The device of claim 22 wherein the framework rules further define base classes, wherein the classes of business logic correspond to at least one of the base classes, the template indicative of mandatory base classes.

24. A method for providing a task management infrastructure in a storage area network comprising:

defining a set of tasks by invoking dialogs corresponding to applications for performing each of the respective tasks;

identifying the set of tasks, each of the tasks corresponding to user defined business logic for performing a particular business function;

determining transactions corresponding to each of the tasks in the set of tasks, the transactions further defining a nested set of commands, the commands indicative of execution units containing user defined business logic class;

building an optimized execution tree by allowing mapping of each of the identified tasks to a corresponding determined transaction in the execution tree, the execution tree indicative of an ordered set of transactions and commands in the identified set of tasks, optimizing further comprising:

identifying hosts in a storage area network for performing the commands in the execution tree, each of the hosts responsive to a SAN (storage area network) manager;

identifying potential resource contention resulting from commands that consume common host resources redundantly, the redundant processing including a first command and a second command, the second command duplicative of the first command, the commands common to multiple tasks, building further including mapping the common commands together as the same task for eliminating duplicative commands, the redundant commands being duplicative open or close operations performed on the same file and mapped together as the same command thus eliminating a duplicative command; and selectively throttling operations by staggering command execution to mitigate competition for processing resources and eliminating the duplicate commands from the execution tree;

persisting the optimized execution tree corresponding to the defined tasks, persisting including storing an indication of the executable objects corresponding to the commands in the execution tree, the persisted execution tree is configured for retrieving the corresponding executable objects for execution.

25. The method of claim 24 wherein the redundant commands are the same command performed by multiple tasks.

26. A computer program product having a computer readable storage media for storing computer program logic embodied in computer program code encoded thereon for implementing tasks in a managed information environment comprising:

computer program code for identifying a set of tasks, each of the tasks corresponding to user defined business logic for performing a particular business function;

computer program code for determining transactions corresponding to each of the tasks in the set of tasks, the transactions further defining a nested set of commands, the commands indicative of execution units containing user defined business logic;

computer program code for building an optimized execution tree by mapping each of the identified tasks to a corresponding determined transaction in the execution tree, the execution tree indicative of the commands in the identified set of tasks, optimizing further comprising:

identifying hosts in a storage area network for performing the commands in the execution tree, each of the hosts responsive to a SAN (storage area network) manager;

identifying potential resource contention resulting from commands that consume common host resources redundantly from multiple tasks, the redundant processing including duplicative open or close operations performed on the same file;

eliminating the duplicative commands by mapping together as the same command; and selectively throttling operations by staggering command execution to mitigate competition for processing resources; and computer program code for persisting the optimized execution tree, persisting including storing an indication of the execution units and data corresponding to the commands in the execution tree, the persisted execution tree is configured for retrieving the corresponding execution units for execution.

* * * * *